Oct. 8, 1940.  C. CONDIT  2,216,806
VALVE SETTING MEANS
Filed July 26, 1939
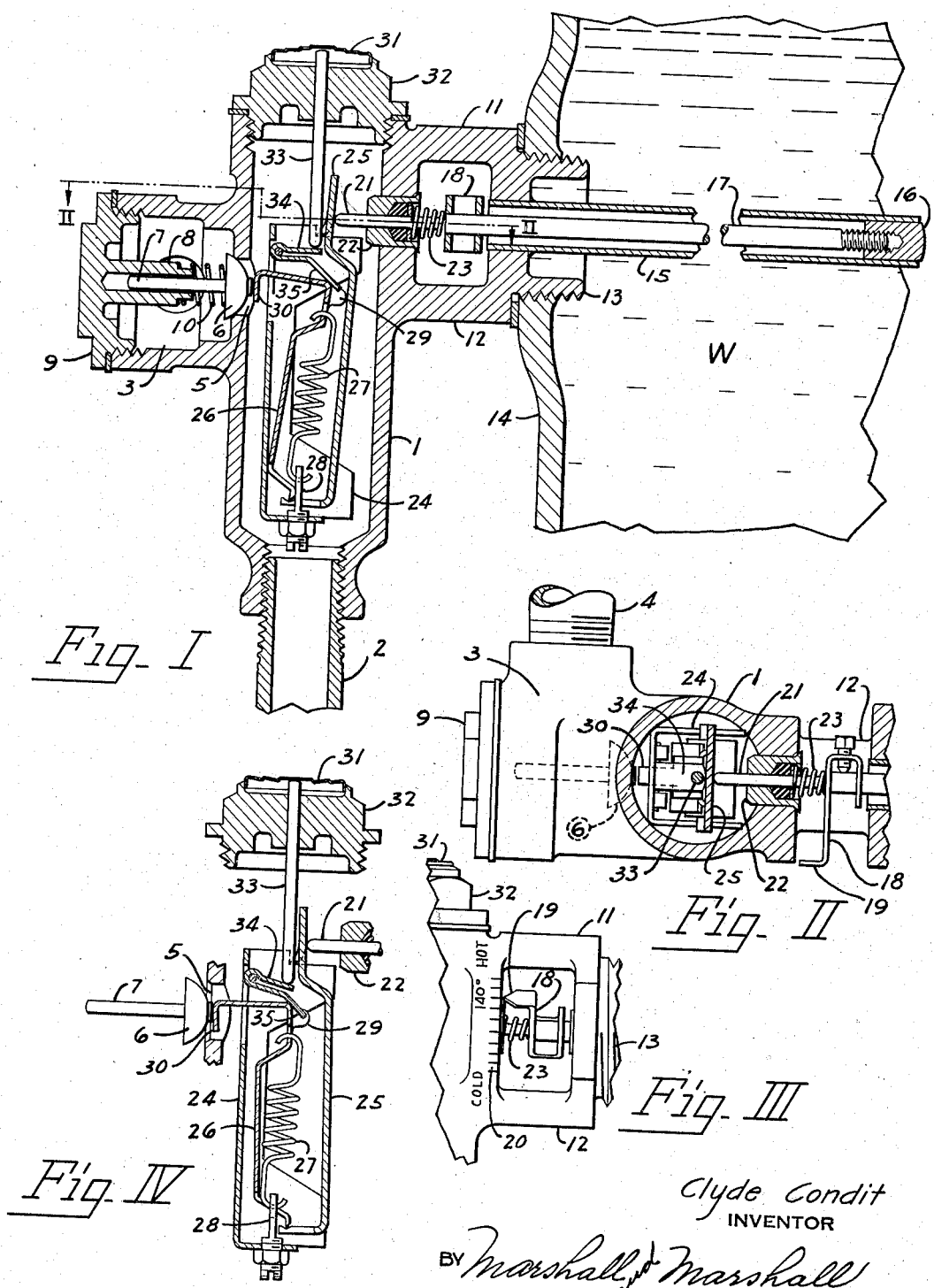
Clyde Condit
INVENTOR
BY Marshall and Marshall
ATTORNEYS Patented Oct. 8, 1940

2,216,806

UNITED STATES PATENT OFFICE 2,216,806

VALVE SETTING MEANS

Clyde Condit, Toledo, Ohio

Application July 26, 1939, Serial No. 286,632

5 Claims. (Cl. 236—48)

This invention relates to valve setting means, and particularly to means for setting thermostatically controlled valves.

Thermostatically controlled valves such as are used in connection with domestic water heaters are arranged to open and supply gas to burners when the water to be heated cools below a predetermined temperature, such for example as 135° F., and to close and shut off the supply of gas when the temperature of the water rises to a higher predetermined temperature, such as 145° F. Thermostats controlling the valves are either permanently calibrated to open and close the valves at proper predetermined temperatures, or are provided with devices by means of which users can adjust them for various opening and closing temperatures.

For most household purposes, such as dish washing and use in lavatories and tub and shower baths, water temperatures above about 145° F. are not required, but for occasional purposes, such as washing clothes, higher water temperatures are desirable. If, however, the thermostats are set to heat water to such higher temperatures, the consumption of gas is increased, the deposit of scale within the heating apparatus is accelerated, and users are subjected to hazards of scalding.

Some known types of thermostatically controlled valves are provided with devices by means of which they can be adjusted for heating water to higher than usual temperatures, when required, and then readjusted for again keeping the water at lower temperatures, but users of such adjustable valves are liable to neglect to readjust them when the need for hotter water has passed, and in practice they are seldom adjusted and readjusted.

It is an object of this invention to provide means for manually setting a thermostatically controlled valve to remain open until a predetermined high temperature is reached, which means thereupon automatically resets the controlling mechanism to close at a lower temperature.

It is a further object of this invention to provide such automatically acting resetting means which is gas-tight and safe, and which will reliably and consistently perform its functions throughout a useful life the duration of which is co-extensive with that of other durable parts of the heating apparatus with which it is incorporated.

A further object is to provide such means by a construction which is economical to produce and is capable of incorporation with valves of various types with a minimum increase in their complexity and cost; and Still a further object is to provide a device of this kind which requires neither skill nor care in its manipulation.

Other objects and advantages will be apparent from the following description, in which reference is had to the accompanying drawing illustrating a preferred embodiment of my invention and wherein similar reference numerals designate similar parts throughout the several views.

In the drawing—

Fig. I is a sectional view through a thermostatically controlled valve incorporating my invention, a part of the thermostatic element being broken out and the valve being shown as closed and as connected to a fragment of a tank.

Fig. II is a plan view, partly in section along the line II—II of Fig. I.

Fig. III is a fragmentary elevational view showing a thermostat adjusting means; and Fig. IV is a fragmentary sectional view showing the mechanism of the valve illustrated in Fig. I, the parts being in position to hold the valve open until a high temperature has been attained.

The valve illustrated in the drawing is of a well-known commercial type, having a hollow body 1 into one end of which is threaded a pipe 2 leading to a gas burner (not shown). Integral with the hollow body 1 is a chamber 3, into one side of which is threaded a gas supply pipe 4. A passage or opening 5 leads from the interior of the chamber 3 to the interior of the hollow body 1, and the chamber end of the opening 5 is beveled to form a seat for a valve head 6 that is fixed to a valve stem 7 slidably mounted in a tubular boss 8 which is formed upon a closure plug 9 that is threaded into the chamber 3. An expansive coil spring 10, surrounding the valve stem 7 and extending between the valve head 6 and a shoulder on the tubular boss 8, tends to press the valve head against the seat in the opening 5.

Extending from the body 1, on the side opposite to the chamber 3, is a pair of arms 11 and 12 at the outer ends of which is formed a threaded fitting 13 that is screwed into the wall 14 of a tank holding water W to be heated, and brazed or otherwise sealed into the fitting 13 is a tube 15 of copper or other thermo-expansive metal.

The tube 15 extends into the water W, and its end is closed by a plug 16 having a threaded inner socket into which is screwed the end of a rod 17 made of steel or other metal the thermo-expansion of which is less than that of the metal forming the tube 15.

Fixed to the rod 17, and positioned between the arms 11 and 12, is a handle 18 by which the rod 17 may be turned through a part of a revolution and thus moved slightly into and out of the threaded socket within the plug 16. The handle 18 is provided with a pointer 19 which indicates a temperature setting on a scale 20. The rod 17 has a reduced tip 21 which extends through a bushing 22 into the interior of the valve body 1, and an expansive coil spring 23, compressed between the bushing 22 and a shoulder on the rod 17, serves to prevent looseness of the threaded end of the rod in the socket formed in the plug 16 and to guard against accidental turning.

The interior of the hollow body 1 is cylindrical and the inner wall surface has a pair of longitudinally extending grooves formed therein to receive the edges of a channel-shaped frame 24 which fits tightly within the cylindrical interior of the body. Fulcrumed in notches formed in one end of the channel-shaped frame 24 is a lever 25, the short arm of which is engaged by the tip 21 of the rod 17, while the long arm of the lever has an angularly turned end which is provided with a notch in which is pivoted the chisel-like end of a valve operating finger 26. A retractile coil spring 27 is connected at one end to an ear 28 attached to the frame 24 and is connected at its other end to the finger 26, and serves to hold the fulcrum of the lever 25 and the end of the finger 26 seated in their notches.

As the lever 25 swings about its fulcrum the notch in which the chisel-like end of the valve operating finger 26 is seated moves from one side to the other of a straight line through the points at which the spring 27 is connected to the ear 28 and to the finger 26. When the pivoted end of the finger 26 is thus moved to the left side of the line, as the mechanism is shown in Fig. I, the spring acts to swing the finger to the right until the lugs 29, formed on the finger 26, engage the lever 25. When the pivoted end of the finger is moved to the right of the line through the points at which the ends of the spring 27 are connected, the spring acts to swing the finger to the left, so that the bent free end 30 of the finger engages the valve head 6 and lifts it from its seat. The valve thus is closed and opened by snap action of the finger 26 whenever the pivoted end of the finger is moved from one side to the other of the line through the points of attachment of the spring 27.

The spring 27 not only acts to hold the parts assembled, but it also acts to keep the short arm of the lever 25 pressed against the tip 21 of the rod 17. As the tube 15 expands under the influence of heat the tip 21 of the rod 17 permits the lever 25 to be swung about its fulcrum by the action of the spring 27 until the pivoted end of the finger 26 is moved to a position in which the spring snaps the finger to permit the valve head 6 to be seated by the action of the expansive spring 10. When the tube contracts as the water cools, or is replaced by cold water, the tip 21 of the rod 17 pushes the lever 25 into the position in which the finger snaps against the valve head 6 and unseats it from the opening, thus supplying gas to the burner to reheat the water. By moving the handle 18, the effective length of the thermostat may be adjusted to open and close the valve at various water temperatures.

While the thermostatically controlled valve so far described is neither new nor is it per se of my invention, it is illustrated and described herein as an example of one form of valve with which the other elements of my invention may be incorporated, and is illustrated and described also to make clear the functioning and operation of the combination of my invention.

In order to temporarily set the valve to close at a higher temperature, I provide means for temporarily offering yieldable resistance to the snap action of the finger 26 which permits the valve to close, so that it is necessary for the thermostat to expand further and swing the lever 25 to carry the pivoted end of the finger 26 further to the right of the line joining the points of connection of the spring 27 to the ear 28 and the finger 26, and in order that the yieldable resistance device may automatically become inoperative after once having offered resistance to the valve closing mechanism I make the yieldable resistance offering device also of the snap action type.

Any preferred form of yieldable snap action resistance offering device may be used, but I prefer to employ a snap action diaphragm 31. In applying my invention to a valve of the type illustrated, I mount the snap action diaphragm 31 on a closure plug 32 which is threaded into the end of the hollow valve body 1 and provide a push rod 33 which is slidably mounted in the closure plug 32 and acts upon a vane 34 that is pivoted to the frame 24 and has an inclined surface 35 which engages a corner formed on the finger 26.

When the diaphragm 31 is sprung outwardly in the condition in which it is shown in Fig. I, the push rod 33 may slide freely outwardly to a position in which it offers no interference with the swinging movement of the vane 34, and the vane 34 therefore swings freely and does not interfere with the normal functioning of the thermostatic valve operating mechanism. With the diaphragm 31 in this condition, the thermostatically operated valve functions in the same manner as though it were not equipped with the device of my invention.

If, however, the user desires a tankful of exceptional hot water, she merely presses the diaphragm 31, thus causing it to snap inwardly and force the push rod 33 against the vane 34, which presses the finger 26 against the valve head 6, so that the parts assume the positions in which they are shown in Fig. IV. When the diaphragm 31 is sprung inwardly it offers sufficient resistance to movement of the finger 26 to prevent the valve from closing until expansion of the thermostat has swung the lever 25 somewhat beyond the position in which the spring 27 normally acts to snap the finger 26 away from the valve head 6.

When the lever 25 has been swung sufficiently to cause the spring 27 to snap the finger 26 to the right, the corner of the finger 26 riding against the inclined surface 35 of the vane 34 moves the vane and push rod 23 outwardly, and the diaphragm 31 snaps outwardly and again assumes the position in which it is shown in Fig. I. Thus there is no danger that the user may forget to reset the valve after one tank of water has been heated to a high temperature. If another tank of exceptionally hot water is required, the user may of course again press the diaphragm.

The diaphragm 31 may easily be snapped inwardly by manual pressure either while the valve mechanism is in the position in which it is shown in Fig. I or while the valve mechanism is in the position in which it is shown in Fig. IV, and while other forms of snap action devices may be substituted for the diaphragm, I prefer a diaphragm, not only because of its ease of manipulation, but because it is gas-tight, inexpensive, and not liable to damage.

The degree to which the water will be additionally heated depends upon the area and stiffness of the diaphragm, as well as upon the manner in which it is connected to the valve operating mechanism. I recommend that the diaphragm be so constructed and connected to the valve operating mechanism that when snapped into operative position it will hold the valve open until the temperature has been raised about 20 degrees above that at which the valve normally closes; and I have found that diaphragms stamped by the same die, from metal of the same kind and thickness, give almost exactly the same results when incorporated with similar valve operating mechanism. For this reason, diaphragms stamped by the same die can be incorporated in valves with assurance that they will all operate to hold the valves open until the water has been additionally heated to a definite number of degrees.

The additional rise in temperature required to actuate the thermostatically controlled mechanism when the diaphragm is sprung inwardly is approximately the same for all settings of the pointer 19. For examples, if the pointer is so set that the valve closes when the water reaches a temperature of 140° F. while the diaphragm 31 is sprung outwardly, and the water reaches a temperature of 160° F. before closing the valve while the diaphragm 31 is sprung inwardly, and then the pointer 19 is turned to a position in which the valve will close when the water is heated to 145° F. with the diaphragm 31 sprung outwardly, the additional rise in temperature required to cause the valve to close while the diaphragm 31 is sprung inwardly will still be 20 degrees; i. e., with the diaphragm 31 sprung inwardly the valve will close when the temperature of the water reaches 165° F.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a valve casing, thermostatically controlled valve closing mechanism, yieldable means sealing said casing and adapted to be manually set to cause increased resistance to the valve closing action of said mechanism, and means acting upon valve closing action of said mechanism against such increased resistance to automatically reset said yieldable means and thereby eliminate such increased resistance.

2. In a device of the class described, in combination, a valve casing, thermostatically controlled mechanism for closing valves, a snap action diaphragm sealing said casing and adapted to be manually snapped in one direction, and means connecting said diaphragm to said mechanism to cause increased resistance to the valve closing action of said mechanism when said diaphragm is manually snapped in one direction, said means acting upon valve closing action of said mechanism to snap said diaphragm in the opposite direction and thereby release said mechanism from such increased resistance.

3. In a device of the class described, in combination, a valve casing, thermostatically controlled valve closing mechanism, a snap action diaphragm sealing said casing and adapted to be manually snapped in one direction to increase resistance to valve closing action of said mechanism, and means operable upon valve closing action of said mechanism to snap said diaphragm in the opposite direction and relieve such increased resistance.

4. In a device of the class described, in combination, a valve casing, a thermostatically closable valve, a snap action diaphragm sealing said casing and adapted to be manually snapped in one direction to resist closing of said valve, and means actuated upon the closing of said valve against the resistance of said diaphragm to snap said diaphragm in the opposite direction and relieve such resistance.

5. In a device of the class described, in combination, a valve casing, thermostatically controlled valve closing mechanism, a snap action diaphragm sealing said casing and adapted to be manually pressed in one direction, and means for transmitting the snap action in such direction from said diaphragm to said mechanism for increasing resistance to the valve closing action of said valve closing mechanism and for transmitting movement from said mechanism to snap said diaphragm in the opposite direction.

CLYDE CONDIT.